United States Patent
Maerz et al.

(10) Patent No.: US 9,850,731 B2
(45) Date of Patent: Dec. 26, 2017

(54) LUBRICATOR WITH INTERCHANGEABLE PORTS

(71) Applicant: 1069416 ALBERTA LTD., Calgary (CA)

(72) Inventors: Stephen Maerz, Strathmore (CA); Leigh Durling, Calgary (CA); Watcharin Suttipisetchart, Calgary (CA)

(73) Assignee: 1069416 ALBERTA LTD., Calgary (CA)

( * ) Notice: Subject to any disclaimer, the term of this patent is extended or adjusted under 35 U.S.C. 154(b) by 783 days.

(21) Appl. No.: 14/041,274

(22) Filed: Sep. 30, 2013

(65) Prior Publication Data

US 2014/0090830 A1    Apr. 3, 2014

Related U.S. Application Data

(60) Provisional application No. 61/707,260, filed on Sep. 28, 2012.

(51) Int. Cl.
| | |
|---|---|
| *E21B 33/068* | (2006.01) |
| *E21B 43/12* | (2006.01) |
| *F04B 47/12* | (2006.01) |
| *F16L 41/08* | (2006.01) |

(52) U.S. Cl.
CPC .......... *E21B 33/068* (2013.01); *E21B 43/121* (2013.01); *F04B 47/12* (2013.01); *F16L 41/086* (2013.01)

(58) Field of Classification Search
CPC .... E21B 33/068; E21B 43/121; F16L 41/086; F16L 41/12; F16L 41/14; F04B 47/12; F04B 53/16; F04B 53/18; E05B 17/2046; F16N 7/38; F16N 11/08; F16N 13/02; F16N 13/10
USPC .......................................... 166/105; 292/151
See application file for complete search history.

(56) References Cited

U.S. PATENT DOCUMENTS

| | | | | |
|---|---|---|---|---|
| 1,414,402 | A * | 5/1922 | Friedman | E21B 43/121 166/106 |
| 2,681,817 | A * | 6/1954 | Demlow | F16L 23/0283 285/368 |
| 2,970,547 | A * | 2/1961 | McMurry | F04B 47/12 166/64 |

(Continued)

FOREIGN PATENT DOCUMENTS

CA         2635993 C     12/2009

OTHER PUBLICATIONS

May 13, 2016 STIC EIC 3600 Search Report.*

*Primary Examiner* — George Gray
(74) *Attorney, Agent, or Firm* — Bennett Jones LLP

(57) ABSTRACT

A lubricator is provided which has a unitized body with at least one port in communication with the body's bore and its outer surface, to which port(s) connectors with different outer fittings for further connection to other equipment may be attached and sealed, and later detached and replaced with other connectors. The connectors may have different outer fittings or may be a plug or valve. This allows the connection of a single port to external equipment to be changed and the fitting for that external equipment's connection to be altered, without having to disconnect the lubricator from its wellhead and stem or any of the lubricator's other connections.

7 Claims, 2 Drawing Sheets

(56) References Cited

U.S. PATENT DOCUMENTS 3,095,819 A * 7/1963 Brown .................. F04B 47/12
137/624.11
2009/0308691 A1 * 12/2009 Commins ............. E21B 33/068
184/14

* cited by examiner

LUBRICATOR WITH INTERCHANGEABLE PORTS

FIELD OF THE INVENTION

The invention relates to a plunger lubricator.

BACKGROUND

During fluid production operations, a plunger lift system is sometimes used when pressure within a wellbore is insufficient to cause fluid to rise naturally. In a plunger lift system, a plunger serves as a mechanical interface between lift gas below the plunger and produced fluid above the plunger. At the surface, a lubricator is used to absorb the kinetic energy of the plunger and to recover the plunger from the wellbore. The lubricator has fluid flow ports where produced fluids may exit.

Canadian patent no. 2,635,993 discloses a plunger lubricator housing, which comprises an elongated tubular body made from a single piece of material. The body has a first end, a second end, an outer surface, an inner surface that defines a plunger receiving interior bore, and radial ports which provide fluid communication between the interior bore and the outer surface.

BRIEF DESCRIPTION OF THE DRAWINGS

Drawings are included for the purpose of illustrating certain aspects of the invention. Such drawings and the description thereof are intended to facilitate understanding and should not be considered limiting of the invention. Drawings are included, in which.

DETAILED DESCRIPTION OF VARIOUS EMBODIMENTS

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

Figures 1A, 1B:
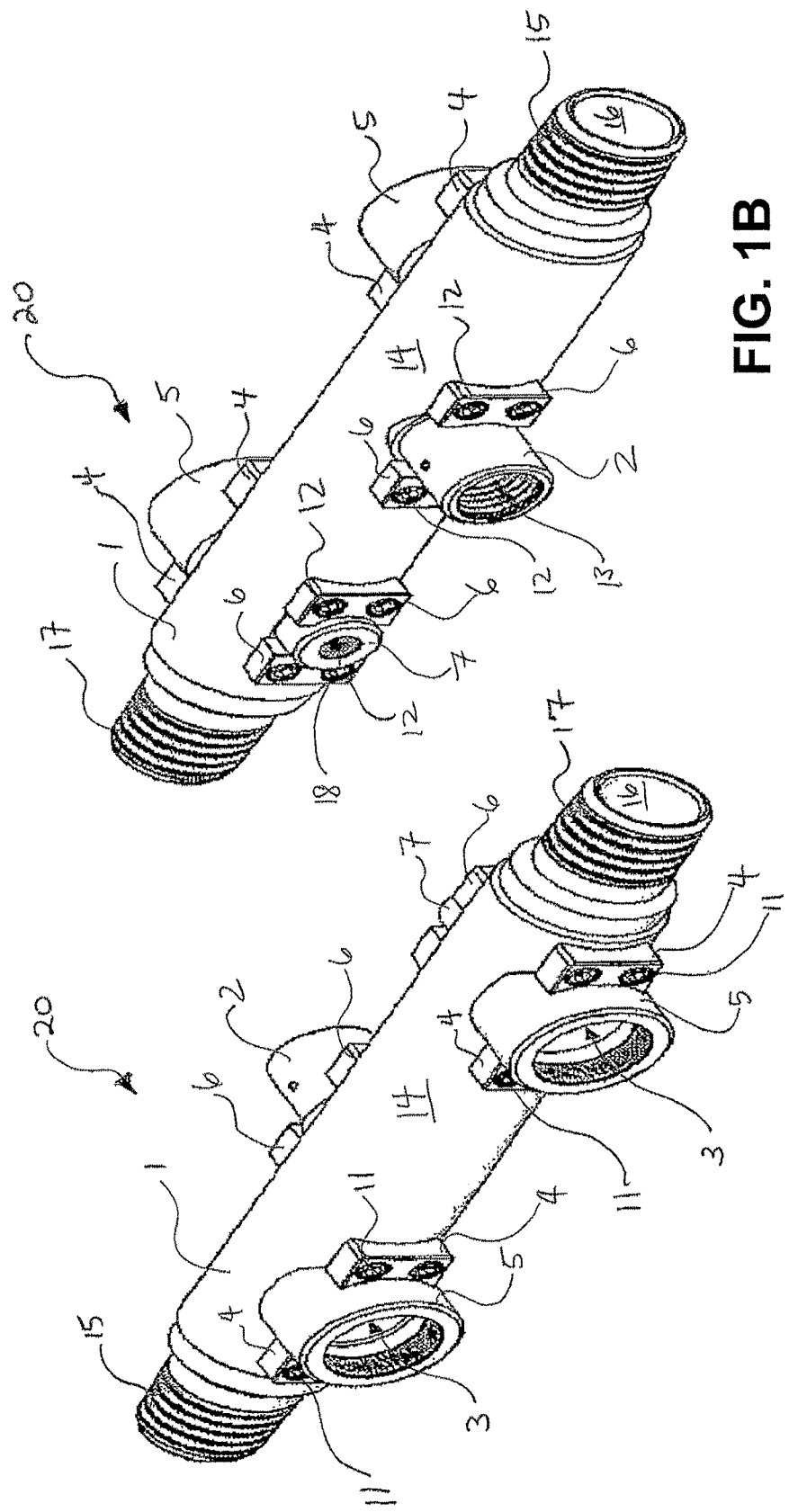
FIG. 1A is a perspective view of a first side of a lubricator.
FIG. 1B is a perspective view of a second side of the lubricator.
Figure 2:
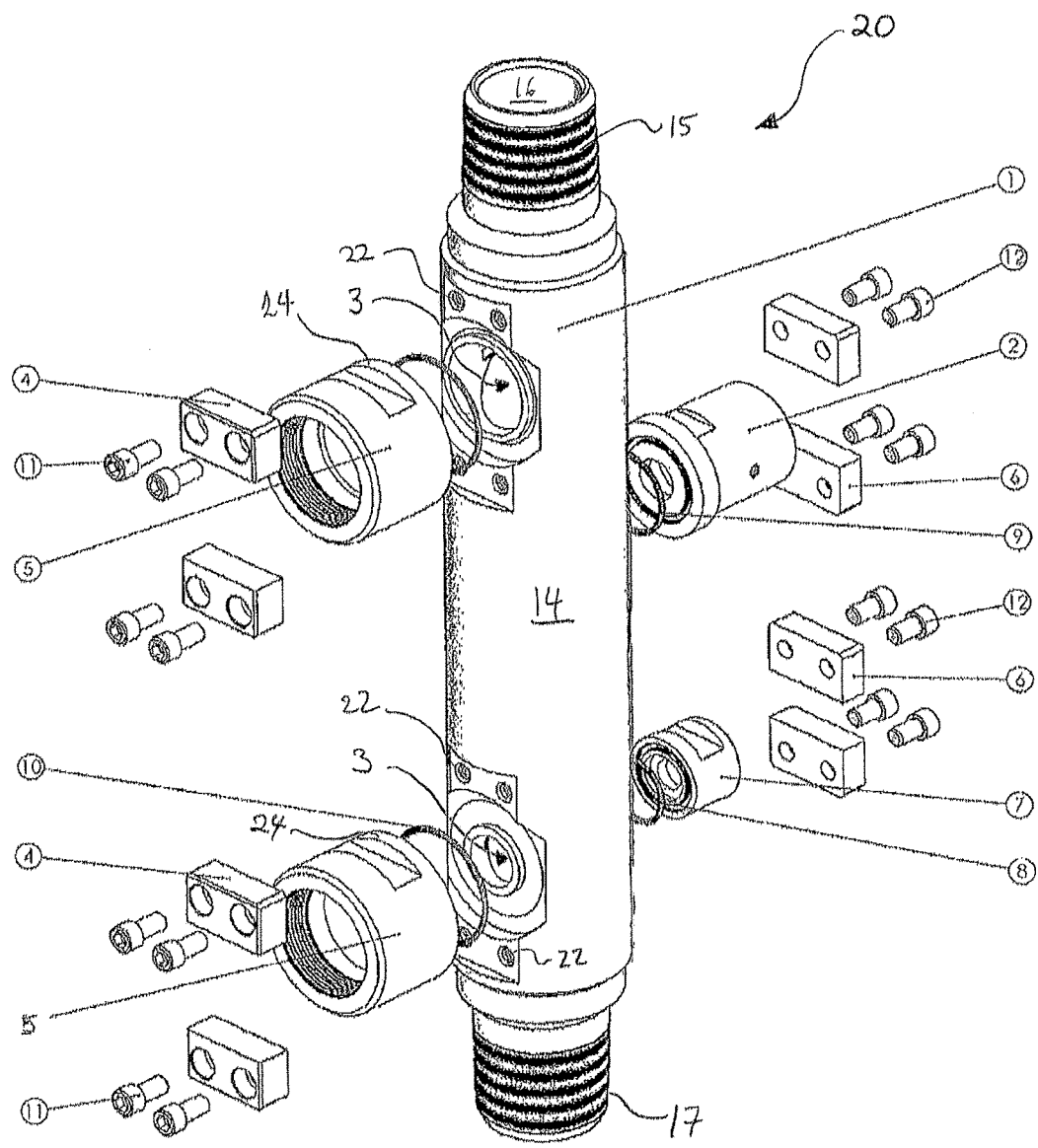
FIG. 2 is an exploded view of the lubricator.

Referring to FIGS. 1A, 1B, and 2, a lubricator 20 comprises a body 1, the body having an outer surface 14 and an axial inner bore defined by an inner surface 16. The inner bore is for receiving a plunger (not shown). Lubricator 20 also includes a well head connection 15 at a first end for connecting to a well head (not shown), and a stem connection 17 at a second end for connecting to a stem (not shown). Lubricator 20 may be formed by forging, machining bar stock, casting, or a combination of known manufacturing methods.

Lubricator 20 further includes flow ports collectively designated 3 which allow fluid to flow between the inner bore and the outer surface 14. Flow ports 3 are each releaseably connectable to a first end of a flow line connector 5 having an inner bore for fluid to flow therethrough. Flow port 3 may be connected to the flow line connector 5 by various methods. Flow ports 3 may be recessed from outer surface 14 for receiving the first end of flow line connector 5. In one embodiment, outer surface 14 includes holes collectively designated 22 around flow ports 3 for receiving fasteners collectively designated 11. In a further embodiment, flow line connector 5 has flanges 24 and connector 5 may be secured to the body 1, with the connector's inner bore substantially aligned with the opening of flow port 3, by having its flanges 24 clamped on to body 1 by clamps collectively designated 4. Clamps 4 have apertures for receiving fasteners 11 and the length of fasteners 11 is sufficient to penetrate through clamps 4 into holes 22. When assembled, flange 24 is clamped between the body 1 and clamp 4, and clamp 4 is secured against body 1 by fasteners 11. Fasteners 11 may be screws and holes 22 may be internally threaded to mate with fasteners 11. In one embodiment, when connector 5 is connected to flow port 3, connector 5 extends radially outwardly from outer surface 14. A person skilled in the art can appreciate that there exist other ways to attach connector 5 to flow port 3, including a threaded connection wherein the first end of connector 5 is internally threaded and flow port 3 includes an externally threaded nipple for mating with the first end of connector 5, and vice-versa. An o-ring 10 may be included to fluidly seal the connection between flow port 3 and flow line connector 5. Other methods for sealing the connection, as known to those skilled in the art, may also be employed. A second end of the connector 5 is connectable to a flow line (not shown) by various methods, including a threaded connection. In one embodiment, the second end of connector 5 is internally or externally threaded for connecting to the flow line.

Lubricator 20 may also be provided with a port 18, which may be used for attaching gauges or sensors, or for injecting chemicals. Lubricator 20 may also comprise a catcher port 13 to catch a plunger at the top of its stroke. Ports 18 and 13 allow fluid to flow between the inner bore and the outer surface 14. Ports 18 and 13 are each releaseably connectable to a first end of a connector 7 and a catcher stemlet 2, respectively. Connector 7 and stemlet 2 may each have an inner bore for fluid to flow therethrough. Ports 18 and 13 may be connected to the connector and stemlet by various methods. Ports 18 and 13 may be recessed from outer surface 14 for receiving the first end of connector 7 and stemlet 2, respectively. In one embodiment, outer surface 14 includes holes around ports 18 and 13 for receiving fasteners collectively designated 12. In a further embodiment, connector 7 and stemlet 2 each have flanges and connector 7 and stemlet 2 may be secured to the body 1, with their inner bore substantially aligned with the opening of ports 18 and 13, respectively, by having their flanges clamped on to body 1 by clamps collectively designated 6. Clamps 6 have apertures for receiving fasteners 12 and the length of fasteners 12 is sufficient to penetrate through clamps 6 into the holes. When assembled, the flanges of connector 7 and stemlet 2 are clamped between the body 1 and clamps 6, and clamps 6 are secured against body 1 by fasteners 12. Fasteners 12 may be screws and the holes may be internally threaded to mate with fasteners 12. In one embodiment, when connector 7 and stemlet 2 are connected to ports 18 and 13, respectively, connector 7 and stemlet 2 extend radially outwardly from outer surface 14. A person skilled in the art can appreciate that there exist other ways to attach connector 7 and stemlet 2 to ports 18 and 13, respectively, including a threaded connection wherein the first end of connector 7 and stemlet 2 is internally threaded and ports 18 and 13 include an externally threaded nipple for mating with the first end of connector 7 and stemlet 2, and vice-versa. O-rings 8 and 9 may be included to fluidly seal the connections between port 18 and connect 7, and port 13 and stemlet 2, respectively. Other methods for sealing the connections, as known to those skilled in the art, may also be employed. A second end of the connector 7 or stemlet 2 may be connectable to another component, such as a gauge, a sensor, a chemical supply line, etc., by various methods, including a threaded connection. In one embodiment, the second end of connector 7 or stemlet 2 is internally or externally threaded for connecting to another component.

In one embodiment, lubricator 20 includes an equipment attachment which may be used for attaching a sensor to indicate the arrival of a plunger. In another embodiment, other components, such as lifting eyelets, are welded or otherwise attached to lubricator 20.

In one embodiment, body 1 is constructed from a single piece of material, which is machined, forged, or casted to form the inner bore and outer surface 14. The material of body 1 may be any metal meeting proper specifications for strength, temperature rating, ductility, durability, corrosion resistance, capability of being welded, worked or machined, typically a steel, and preferably 4130 or 4140 carbon steel. In a further embodiment, ports 3, 13, and 18 are machined into the body. Well head connection 15 is machined at the first end, and stem connection 17 is machined at the second end. Various connectors or stemlets may be connected to the ports using various methods, including those described above. In a further embodiment, outer surface 14 is machined to have an increased thickness at various points along the length of the lubricator 20 such that the lubricator 20 may have increased thickness about ports 3, 13, and 18, or at other locations.

Since connectors and stemlets are removably connected to the ports, the connectors and stemlets may be replaced individually when necessary without de-installing the whole lubricator from the wellhead. In addition, the lubricator described herein may have a standardized body that can be customized using a multiplicity of connectors and stemlets. This may reduce the inventory requirements of lubricators to supply all connector-type demands, and may also permit mixing and matching connections without additional machining or modification of the lubricator body.

In some exemplary embodiments our invention provides a lubricator for receiving a plunger for a plunger lift system, comprising: an elongated, substantially cylindrical body having an outer surface, and an inner surface defining a bore longitudinally disposed within the body, the body having at least a flow port roughly radially disposed through a wall of the body forming a passage allowing fluid to flow between the bore and the body's outer surface; a well head connection at a bottom end of the lubricator body for connecting a well head; a stem connection at a top end of the lubricator body for connecting to a stem portion of the plunger lift system above the wellhead and lubricator when installed; a substantially tubular external connector to attach external equipment to the lubricator providing a sealed passageway for fluid from the wellbore through the lubricator body's bore, through the flow port and through the tubular external connector to the external equipment, the external connector being sealably attachable to the lubricator body's external wall via a clamp and seal system comprising: on the lubricator body's external surface adjacent and surrounding the flow port's passage, a substantially flat surface area to receive a static seal under compression by a mating portion of a first end of the external connector; adjacent the flow port's passage outside of the static seal's compressed position a plurality of threaded bolt holes; the static seal; in the external surface of the first end of the external connector proximate to but a distance from the mating portion of the first end, a plurality of ledges, each ledge having opposing, substantially parallel surface areas, the surface areas being substantially parallel to the flat surface area of the lubricator, and each ledge sized to receive a respective one of a plurality of clamp elements; each of the respective clamp elements engaged with both the respective clamp element ledge and with one or more bolts threaded and tightened into one or more of the threaded bolt holes to compress the static seal; at a second, opposite end of the external connector, a fitting connecting the external equipment to the external connector the clamp and seal system providing a removable and resealable connection between the flow port and the external connector, the clamp and seal system thereby allowing substitutions of the external connector with another external connector, at least when the lubricator is operably connected to the well-bore.

In some exemplary embodiments our invention provides that a. the number of bolt-holes is four; b. the static seal is an O-ring; c. the plurality of ledges and respective clamp elements comprises two ledges and two respective clamp elements, each clamp element having two holes, the holes being aligned with two of the four bolt; and d. the number of bolts is four, two for each of the respective clamp elements.

In some exemplary embodiments our invention provides that the fitting of the second end of the external connector is one of: an internal thread, an external thread, a quick-release external profile, or a clamp-ready surface for a compression fitting.

In some exemplary embodiments our invention a second external connector having a second or outer end, the second end having a different fitting than the first external connector such that different external equipment is connectible to the second end of the second external connector, and further such that the second external connector is connectable to the lubricator body using a second clamp and seal system without requiring a different lubricator or the alteration of any additional connectors being previously connected to the lubricator body.

In some exemplary embodiments our invention provides that the external connector fitting accommodates a plug.

In some exemplary embodiments our invention provides that the flow port comprises a plurality of flow ports, and the clamp and seal system comprises a plurality of clamp and seal systems, and the external connector comprises a plurality of external connectors, each of the plurality of flow ports being associated with one of the clamp and seal systems and one of the external connectors.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are know or later come to be known to those of ordinary skill in the art are intended to be encompassed by the elements of the claims. Moreover, nothing disclosed herein is intended to be dedicated to the public regardless of whether such disclosure is explicitly recited in the claims.

The invention claimed is:

1. A lubricator, for receiving a plunger for a plunger lift system, comprising:
    an elongated, substantially cylindrical body having an outer surface, and an inner surface defining a bore longitudinally disposed within the body, the body having a flow port radially disposed through a wall of the body forming a passage allowing fluid to flow between the bore and the body's outer surface;
    a well head connection at a bottom end of the body for connecting a well head;
    a stem connection at a top end of the lubricator body for connecting to a stem portion of the plunger lift system above the wellhead and lubricator when installed;
    a substantially tubular external connector to attach external equipment to the lubricator providing a sealed passageway for fluid from the wellbore through the lubricator body's bore, through the flow port and through the external connector to the external equipment, the external connector being sealably attachable to the lubricator body's external wall via a clamp and seal system comprising:
        on the lubricator body's external surface adjacent and surrounding the flow port's passage, a substantially flat surface area to receive a static seal under compression by a mating portion of a first end of the external connector
        adjacent the flow port's passage outside of the static seal's compressed position a plurality of threaded bolt holes
        the static seal;
        in the external surface of the first end of the external connector proximate to but a distance from the mating portion of the first end, a plurality of ledges, each ledge having opposing, substantially parallel surface areas, the surface areas being surface substantially parallel to the flat surface area of the lubricator, and each ledge sized to receive a respective one of a plurality of clamp elements
        each of the respective clamp elements engaged with both the respective clamp element ledge and with one or more bolts threaded and tightened into one or more of the threaded bolt holes to compress the static seal
        at a second, opposite end of the external connector, a fitting connecting the external equipment to the external connector
        the clamp and seal system providing a removable and resealable connection between the flow port and the external connector, the clamp and seal system thereby allowing substitutions of the external connector with another external connector, at least when the lubricator is operably connected to the well-bore.

2. The lubricator of claim 1, wherein
    a. the number of bolt-holes is four;
    b. the static seal is an O-ring;
    c. the plurality of ledges and respective clamp elements comprises two ledges and two respective clamp elements, each clamp element having two holes, the holes being aligned with two of the four bolt-holes; and
    d. the number of bolts is four, two for each of the respective clamp elements.

3. The lubricator of claim 2, wherein the flow port comprises a plurality of flow ports, and the clamping and sealing system comprises a plurality of clamp and seal systems, and the external connector comprises a plurality of external connectors, each of the plurality of flow ports being associated with one of the clamp and seal systems and one of the external connectors.

4. The lubricator of claim 1, wherein the fitting of the second end of the external connector is one of: an internal thread, an external thread, a quick-release external profile, or a clamp-ready surface for a compression fitting.

5. The lubricator of claim 1, further comprising a second external connector having a second or outer end, the second end having a different fitting than the first external connector such that different external equipment is connectible to the second end of the second external connector, and further such that the second external connector is connectable to the lubricator body using a second clamp and seal system without requiring a different lubricator or the alteration of any additional connectors being previously connected to the lubricator body.

6. The lubricator of claim 1, wherein the external connector fitting accommodates a plug.

7. The lubricator of claim 1, wherein the flow port comprises a plurality of flow ports, and the clamp and seal system comprises a plurality of clamp and seal systems, and the external connector comprises a plurality of external connectors, each of the plurality of flow ports being associated with one of the clamp and seal systems and one of the external connectors.

* * * * *